(12) United States Patent
Cansler, Jr. et al.

(10) Patent No.: US 7,551,973 B2
(45) Date of Patent: Jun. 23, 2009

(54) USER INTERFACE INDICATING PAST, PRESENT AND FUTURE SONGS PLAYED IN A STREAMING MUSIC CHANNEL

(75) Inventors: James L. Cansler, Jr., Pflugerville, TX (US); Philip T. Kortum, Houston, TX (US); Marc A. Sullivan, Austin, TX (US); Alyssa Williams, Elmhurst, IL (US); Brett A. Anderson, Fair Oaks Ranch, TX (US)

(73) Assignee: AT&T Intellectual Property I, L.P., Reno, NY (US)

( * ) Notice: Subject to any disclaimer, the term of this patent is extended or adjusted under 35 U.S.C. 154(b) by 722 days.

(21) Appl. No.: 11/199,798

(22) Filed: Aug. 9, 2005

(65) Prior Publication Data

US 2007/0039031 A1 Feb. 15, 2007

(51) Int. Cl.
*G06F 17/00* (2006.01)
(52) U.S. Cl. .................................................. 700/94
(58) Field of Classification Search .................. 700/94; 725/32, 37; 370/393
See application file for complete search history.

(56) References Cited

U.S. PATENT DOCUMENTS

| | | | |
|---|---|---|---|
| 7,275,256 B1 * | 9/2007 | Del Beccaro et al. | 725/143 |
| 7,349,663 B1 * | 3/2008 | Joseph | 455/3.02 |
| 2002/0002039 A1 * | 1/2002 | Qureshey et al. | 455/344 |
| 2002/0049974 A1 * | 4/2002 | Shnier | 725/47 |
| 2005/0141709 A1 * | 6/2005 | Bratton | 380/201 |
| 2006/0148528 A1 * | 7/2006 | Jung et al. | 455/566 |
| 2006/0171395 A1 * | 8/2006 | Deshpande | 370/393 |
| 2006/0218187 A1 * | 9/2006 | Plastina et al. | 707/104.1 |

* cited by examiner

Primary Examiner—Curtis Kuntz
Assistant Examiner—Andrew C Flanders
(74) Attorney, Agent, or Firm—Toler Law Group

(57) ABSTRACT

A user interface for a receiver of a streaming music service simultaneously displays a current-song display, a past-song display and a future-song display. The current-song display indicates a current song being broadcast to a plurality of subscribers in a channel of the streaming music service. The past-song display indicates at least one past song which was broadcast in the channel of the streaming music service prior to broadcast of the current song. Each song in the past-song display is selectable by a user of the receiver to initiate playback of a recording thereof by the receiver. The future-song display indicates at least one future song which is scheduled to be broadcast in the channel of the streaming music service after broadcast of the current song.

20 Claims, 5 Drawing Sheets

USER INTERFACE INDICATING PAST, PRESENT AND FUTURE SONGS PLAYED IN A STREAMING MUSIC CHANNEL

FIELD OF THE DISCLOSURE

The present disclosure relates to user interfaces for streaming music channels.

BACKGROUND

Current streaming music channels are delivered to subscribers via the Internet, satellites and cable television plants. Current music channels delivered by satellite and cable television plant systems display information about the current song being played. If the music channel is received by a video set-top box, the set-top box may cause a television set to display information about the current song.

Like other non-personal-computer environments, a video set-top box environment may not provide user access to a mouse and a standard keyboard. As a result, these users may not be given typical personal computer (PC) graphical user interface (GUI) components, such as checkboxes, radio dials, and double-clicking icons to control features of a streaming music service.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Embodiments of the present disclosure provide a user interface for subscribers of a streaming music service who wish to have information about what music will be played in the future and what music has played in the past on a streaming music channel. The user interface is conducive for use with a typical remote control of a television set-top box or another user input device.

Figure 1:
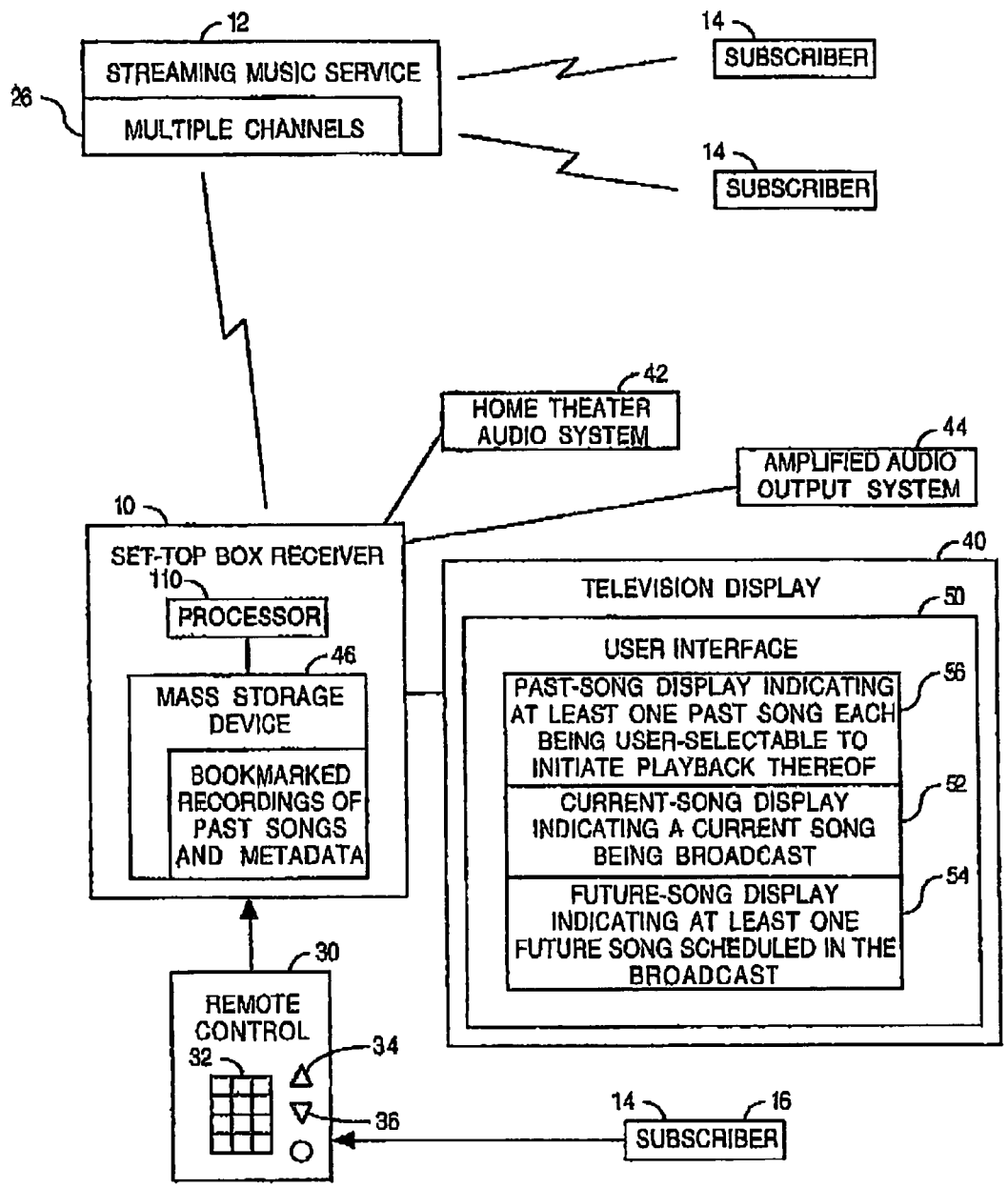
FIG. 1 is a block diagram of an embodiment of a system for indicating past, present and future songs played by a streaming music channel.

FIG. 1 is a block diagram of an embodiment of a system for indicating past, present and future songs played by a streaming music channel. The system comprises a set-top box receiver 10 that provides a receiver of a streaming music service 12. The streaming music service 12 is broadcast to multiple subscribers 14 that include a subscriber 16 associated with the set-top box receiver 10. The streaming music service 12 is broadcast to the multiple subscribers 14 via either the Internet, one or more satellites, a cable television plant, a terrestrial wireless network including but not limited to a 3G network, a broadband network including but not limited to Digital Subscriber Line (DSL), or any combination thereof. The streaming music service 12 may be part of an Internet Protocol Television (IPTV) service, a satellite radio service, an Internet radio service, a cable television service or a satellite television service, for example. The streaming music service 12 provides multiple channels 26 of music content.

Using a remote control 30, the subscriber 16 or another user can select which channel of the multiple channels 26 he/she would like to hear. The channel can be selected by a numeric entry on a numeric keypad 32 of the remote control 30, and/or by one or more depressions of a channel-up button 34 or a channel-down button 36 of the remote control 30. The subscriber 16 can make the channel selection in the course of watching television, for example, on a television display 40 that displays video signals outputted by the set-top box receiver 10.

The set-top box receiver 10 tunes to, receives, and decodes the user-selected music channel. The set-top box receiver 10 outputs an audio signal based on the user-selected music channel. The audio signal may be applied to the television display 40, a home theater audio system 42, or another amplified audio output system 44 so that the subscriber 16 and/or other users can hear the user-selected music channel.

The set-top box receiver 10 includes a mass storage device 46, such as a hard drive, that automatically records one or more songs that are broadcast by the user-selected music channel after its selection. For each of the one or more songs, the mass storage device 46 bookmarks a start time of the song and captures metadata for the song. If the set-top box receiver 10 tunes to the user-selected music channel while the user-selected music channel is broadcasting a song, the beginning of the recording of the song is bookmarked as the start time for the song.

The set-top box receiver 10 outputs a signal to provide a user interface 50 for the streaming music service 12. The user interface 50 may be displayed by the television display 40 or another display device.

Initially, the user interface 50 includes a current-song display 52 indicating a current song being broadcast to the subscribers 14 in the particular channel of the streaming music service 12 (and being played by an audio output device responsive to the set-top box receiver 10). The current-song display 52 may display a name of the current song and additional information about the current song based on the metadata received for the current song. Examples of the additional information include, but are not limited to, an artist who performed the song, an album from which the song comes, a name of the channel and a length of the song. In some embodiments, the current song is displayed as part of a song list, and the additional information (and optionally the name of the current song) is displayed in a floating window beside the song list.

The user interface 50 further includes a future-song display 54 indicating at least one future song which is scheduled to be broadcast in the channel of the streaming music service 12 immediately after broadcast of the current song. The future-song display 54 may display a song name and additional information about each of the at least one future songs based on the metadata received for the at least one future song. The at least one future song includes a next song that immediately follows the current song.

A past-song display 56 indicates at least one past song which was broadcast in the channel of the streaming music service 12 immediately prior to broadcast of the current song. The at least one past song may consist of, at most, each song broadcast by the channel of the streaming music service 12 after the subscriber 16 or another user has tuned the set-top box receiver 10 to the current channel. The user can tune to the current channel by changing from another channel of the streaming music service 12 to the current channel using the set-top box receiver 10, or by changing from a television channel to the current channel of the streaming music service 12.

The current-song display 52, the future-song display 54 and the past-song display 56 are simultaneously displayed by the user interface 50. In some embodiments, the at least one past song in the past-song display 56, the current song in current-song display 52, and the at least one future song in the future-song display 54 are displayed as a song list. The songs in the song list may be ordered chronologically by their actual and scheduled start time.

In some embodiments, the current-song display 52 is disposed between the past-song display 56 and the future-song display 54. For example, the current-song display 52 may be disposed below the past-song display 56 and above the future-song display 54. The current-song display 52 may be in a fixed display location regardless of a number of songs in the past-song display 56 and a number of songs in the future-song display 54.

Once the current song ends: (a) the current song becomes a past song that is added to the past-song display 56; (b) the next song becomes a new current song that is being received and played, and thus is removed from the future-song display 54 and replaced with a subsequent song which is scheduled to follow; and (c) the current-song display 52 is updated to indicate the new current song, in place of the previously-current song, being broadcast to the subscribers 14 in the particular channel of the streaming music service 12.

If the songs are displayed as a song list of past, present and future songs, all of the songs in the song list (with the possible exception of the earliest past song in the song list) may move up a rung (i.e. a level) in the list once the current song ends. If the number of past songs reaches a display limit, the earliest past song in the past-song display 56 may be removed from the past-song display 56 once the current song ends. If the earliest past song is removed from the past-song display 56, the recording of this removed song may be either retained in or removed from the playback buffer of the mass storage device 46.

The mass storage device 46 bookmarks a start time of the new current song, captures metadata for the new current song, and records the new current song. If a playback buffer provided by the mass storage device 46 has insufficient storage space to record the new current song, an earliest-recorded song in playback buffer is automatically deleted. In this way, songs are expired from the song list in a first-in, first-out fashion.

Each song in the past-song display 56 is user-selectable using the remote control 30. A song from the past-song display 56 can be user-selected in a variety of ways. For example, a scroll wheel or dial of the remote control 30 can be rotated in one direction to scroll up the song list and can be rotated in an opposite direction to scroll down the song list. Alternatively, an up button or another button can be repeatedly pressed to scroll up the song list, and a down button or another button can be repeatedly pressed to scroll down the song list. A scroll position can be indicated by highlighting or otherwise modifying a display property of a particular song in the past-song display 56.

Regardless of how users navigate to the particular song in the past-song display 56, either another button or the scroll wheel or dial can be pressed to select the particular song. In response to receiving a user-selection of a particular song in the past-song display 56, the set-top box receiver 10 retrieves the recording of the particular song from the mass storage device 46 (based on the particular song's bookmark) and initiates playback of the recording. The set-top box receiver 10 outputs an audio signal to the television display 40, the home theater audio system 42, or the amplified audio output system 44 so that the subscriber 16 and/or other users can hear the playback of the user-selected past song. Thus, the bookmarking of the songs with the song list allows the subscriber 16 to easily listen to songs he/she has heard in the past without having to rewind the recording for a period of time.

In contrast to the past songs in the past-song display 56 being user-selectable, each future song in the future-song display 54 cannot be selected using the remote control 30 or the set-top box receiver 10 to initiate a playback thereof. This difference is because the streaming music channel is a broadcast channel and not an audio-on-demand channel, and because the mass storage device 46 does not necessarily have a recording of each future song.

It is noted that the metadata for past and future songs may be downloaded to the set-top box receiver 10 via any medium. In general, the medium in which the metadata is delivered can be either the same medium or a different medium in which the music content is delivered. An in-band delivery of the metadata is an implementation in which music content and metadata are delivered over the same medium (e.g. satellite, IPTV, cable TV, etc.). An out-of-band delivery of the metadata is an implementation in which music content is delivered via one medium and the metadata is delivered via another medium.

Figure 2:
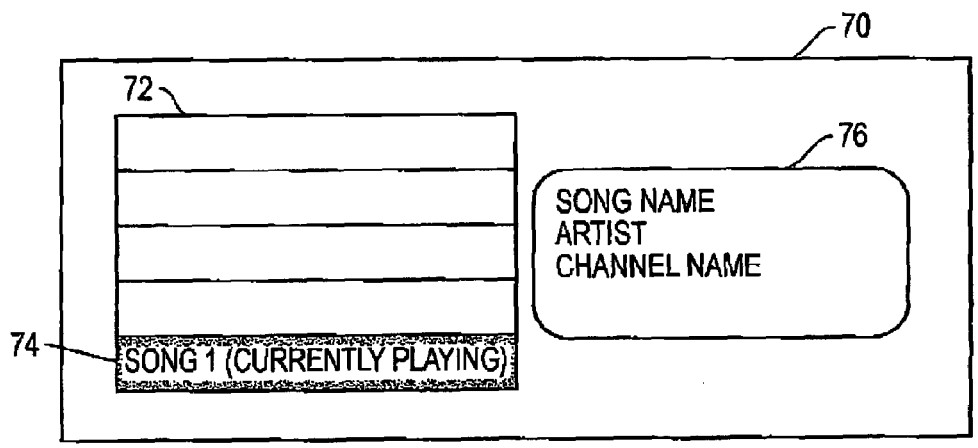
FIG. 2 is an embodiment of a user interface provided by a set-top box receiver for a streaming music service.

FIG. 2 is an embodiment of a user interface 70 provided by the set-top box receiver 10 for the streaming music service 12. The user interface 70 shows a song list 72 including a first-playing song 74. The first-playing song 74 is indicated as currently playing. A floating window 76 beside the song list 72 displays a song name, an artist and a channel name associated with the first-playing song 74.

Figure 3:
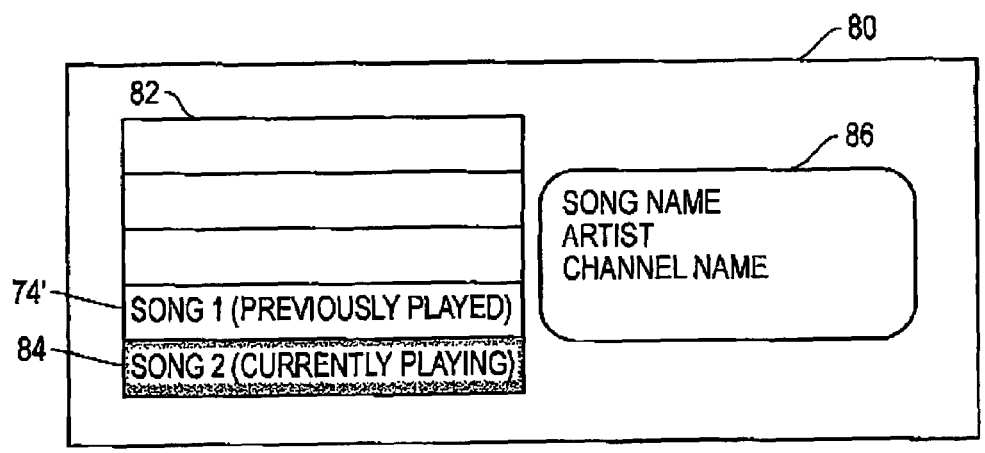
FIG. 3 is an embodiment of a user interface provided by the set-top box receiver for the streaming music service after a first-playing song has ended.

FIG. 3 is an embodiment of a user interface 80 provided by the set-top box receiver 10 for the streaming music service 12 after the first-playing song 74' has ended. The user interface 80 shows an updated song list 82 including the first-playing song 74' and a second-playing song 84. The first-playing song 74', which is indicated as being previously played, can be played again if selected from the updated song list 82 by the subscriber 16. The second-playing song 84 is indicated as currently playing. A floating window 86 beside the updated song list 82 displays a song name, an artist and a channel name associated with the second-playing song 84.

Figure 4:
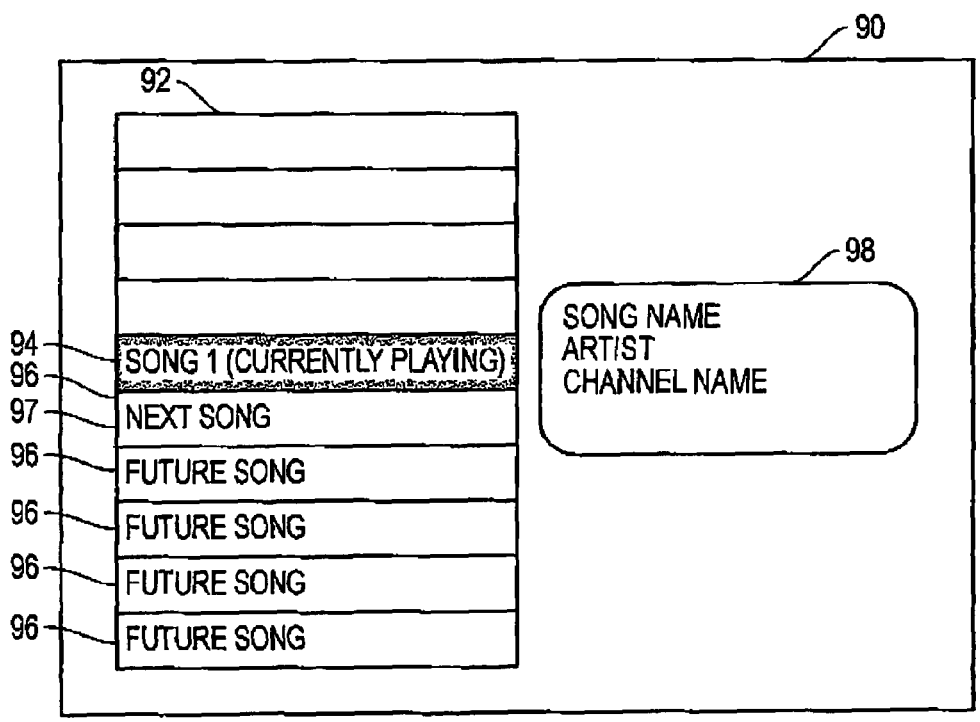
FIG. 4 is another embodiment of a user interface provided by a set-top box receiver for the streaming music service.

FIG. 4 is another embodiment of a user interface 90 provided by the set-top box receiver 10 for the streaming music service 12. The user interface 90 shows a song list 92 including a first-playing song 94 and five future songs 96. The future songs 96 include a next song 97 that is scheduled to follow the first-playing song 94. The first-playing song 94 is indicated as currently playing. A floating window 98 beside the song list 92 displays a song name, an artist and a channel name associated with the first-playing song 94.

Figure 5:
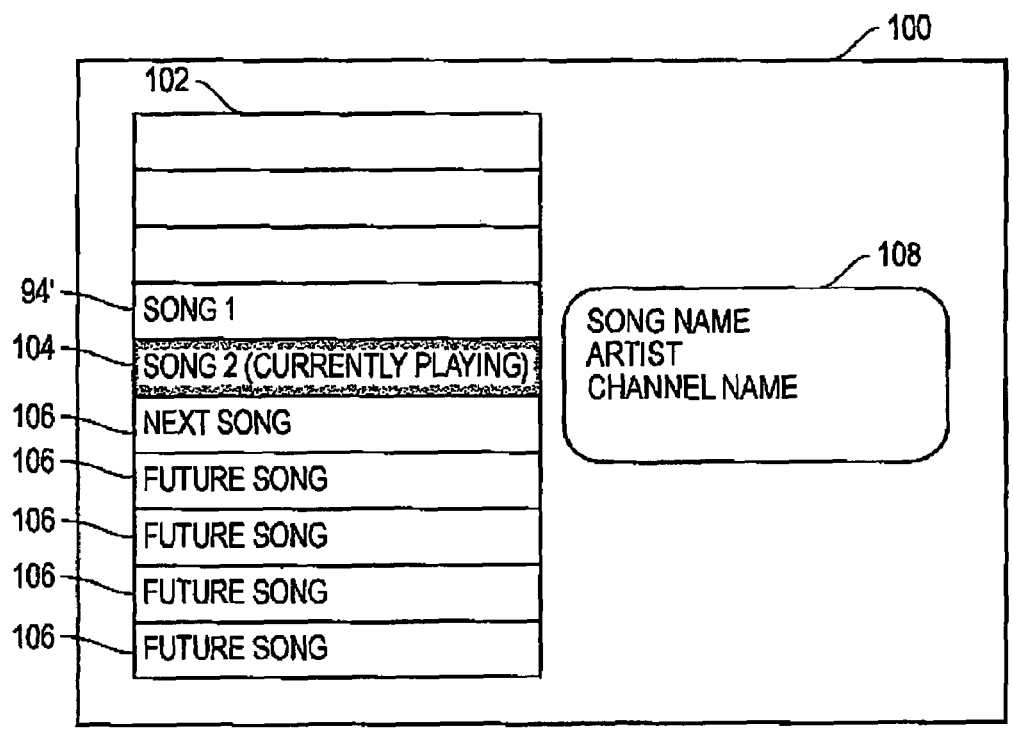
FIG. 5 is an embodiment of a user interface provided by the set-top box receiver for the streaming music service after a first-playing song has ended.

FIG. 5 is an embodiment of a user interface 100 provided by the set-top box receiver 10 for the streaming music service 12 after the first-playing song 94 has ended. The user interface 100 shows an updated song list 102 in which each of the songs in the song list 92 is moved up a rung. The updated song list 102 includes the first-playing song 94', a second-playing song 104, and five future songs 106. The first-playing song 94' can be played again if selected from the updated song list 102 by the subscriber 16. The second-playing song 104, which was indicated as the next song 97 in FIG. 4, is indicated in FIG. 5 as currently playing. A floating window 108 beside the updated song list 102 displays a song name, an artist and a channel name associated with the second-playing song 104.

The herein-disclosed acts performed by the set-top box receiver 10 may be directed by one or more computer processors. The computer processor(s) may perform acts based on computer-readable program code stored by a computer-readable medium.

It will be apparent to those skilled in the art that the disclosed embodiments may be modified in numerous ways and may assume many embodiments other than the particular forms specifically set out and described herein. For example, the list of past, present and future songs may be displayed horizontally rather than vertically in alternative embodiments.

Figure 6:
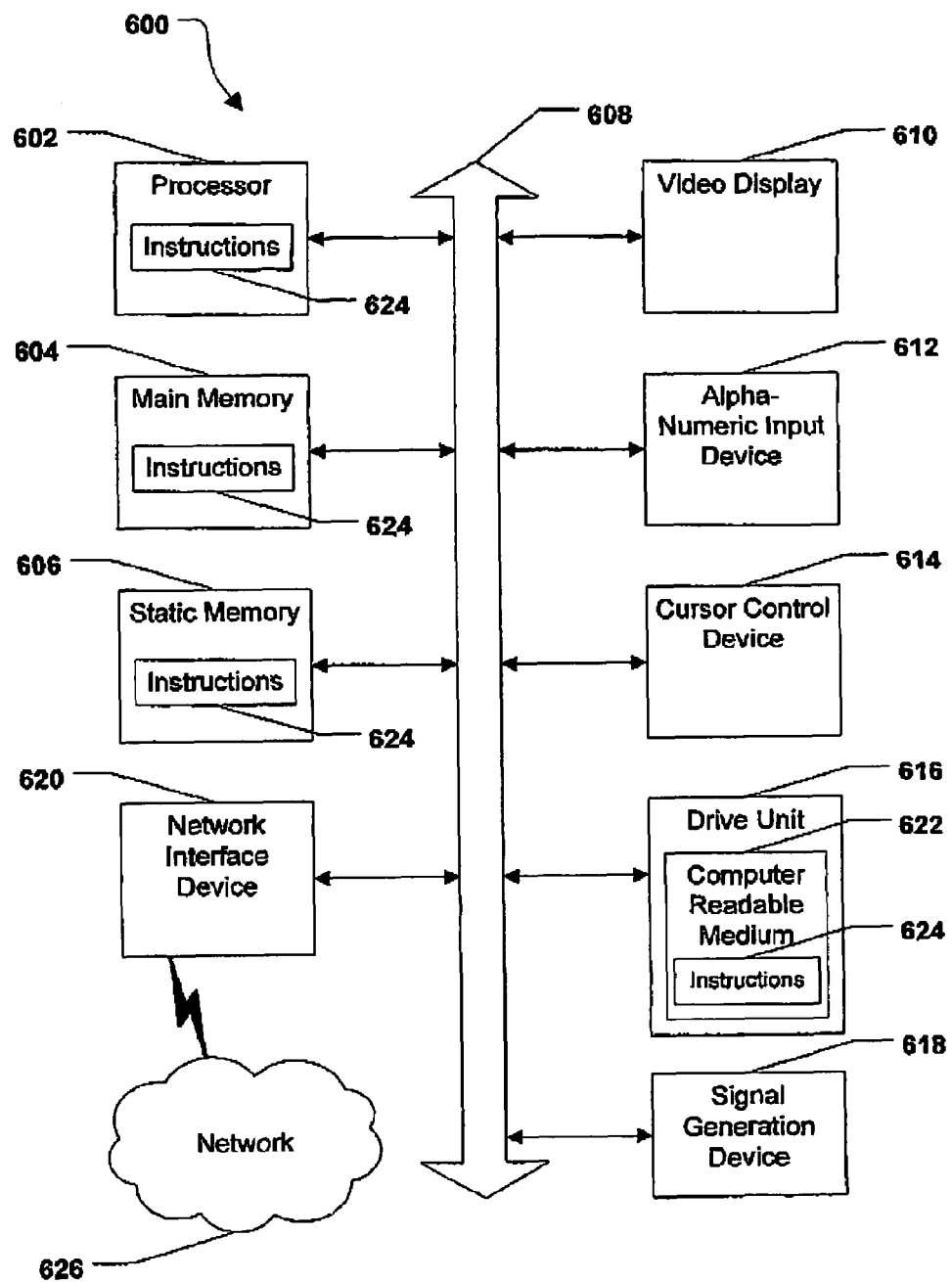
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP)

represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A user interface for a receiver of a streaming music service, the user interface comprising:
    a current-song display indicating a current song being broadcast to a plurality of subscribers in a first channel of the streaming music service;
    a past-song display indicating at least one past song which was broadcast in the first channel of the streaming music service prior to broadcast of the current song, each song in the past-song display being selectable by a user of the receiver to initiate playback of a recording thereof by the receiver; and
    a future-song display indicating at least one future song which is scheduled to be broadcast in the first channel of the streaming music service immediately after broadcast of the current song;
    wherein the current-song display, the past-song display and the future-song display are simultaneously displayed;
    wherein when the user tunes to the first channel of the streaming music service, a song being broadcast is recorded starting from a point when the user turned to the first channel of the streaming music service.

2. The user interface of claim 1 wherein each future song in the future-song display cannot be selected by the user of the receiver to initiate playback thereof.

3. The user interface of claim 1 wherein the at least one past song includes each song broadcast by the first channel of the streaming music service after the user has changed the receiver from a second channel of the streaming music service to the first channel.

4. The user interface of claim 1 wherein the current-song display is in a fixed display location regardless of a number of songs in the past-song display of the at least one past song.

5. The user interface of claim 1 wherein the current-song display is in a fixed display location regardless of a number of songs in the future-song display of the at least one future song.

6. The user interface of claim 1 wherein the at least one past song, the current song and the at least one future song are displayed in a song list.

7. The user interface of claim 1 wherein the current-song display is disposed between the past-song display and the future-song display.

8. The user interface of claim 7 wherein the current-song display is disposed below the past-song display and above the future-song display.

9. The user interface of claim 1 wherein the current song is received and played by the receiver.

10. A system comprising:
    a set-top box receiver to receive a streaming music service and to automatically record received songs; and
    a television display responsive to the set-top box receiver to display a user interface for the streaming music service, the user interface simultaneously displaying a current-song display, a past-song display and a future-song display, the current-song display indicating a current song being broadcast to a plurality of subscribers in a first channel of the streaming music service, the past-song display indicating at least one past song which was broadcast in the first channel of the streaming music service immediately prior to broadcast of the current song, each song in the past-song display being user selectable to initiate playback of a recording thereof by the set-top box receiver, the future-song display indicating at least one future song which is scheduled to be broadcast in the first channel of the streaming music service after broadcast of the current song, wherein when a user tunes to the first channel of the streaming music service a song being broadcast is recorded starting from a point when the user turned to the first channel of the streaming music service.

11. The system of claim 10 further comprising a remote control to communicate with the set-top box receiver, wherein each song in the past-song display is user-selectable by the remote control to initiate playback thereof 12. The system of claim 11 wherein each future song in the future-song display cannot be user selected using the remote control to initiate playback thereof.

13. The system of claim 11 wherein the at least one past song includes each song broadcast by the first channel of the streaming music service after the set-top box receiver has been changed from a second channel of the streaming music service to the first channel using the remote control.

14. The system of claim 10 wherein the current-song display is in a fixed display location regardless of a number of songs in the past-song display of the at least one past song.

15. The system of claim 10 wherein the current-song display is in a fixed display location regardless of a number of songs in the future-song display of the at least one future song.

16. The system of claim 10 wherein the at least one past song, the current song and the at least one future song are displayed in a song list.

17. The system of claim 10 wherein the current-song display is disposed between the past-song display and the future-song display.

18. The system of claim 17 wherein the current-song display is disposed below the past-song display and above the future-song display.

19. The system of claim 10 wherein the set-top box receiver receives metadata for the at least one future song in a first medium and receives content of the current song m a second medium, wherein the first medium differs from the second medium.

20. The system of claim 10 further comprising an audio output device responsive to the set-top box to play the current song.

* * * * *